D. C. Gately.
Vulcanized Rubber.
N° 86,296.  Patented Jan. 26, 1869.
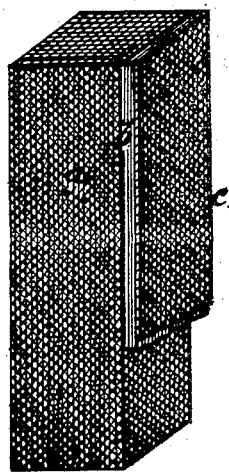
Witnesses:
Inventor:
Dennis C. Gately
by T. A. Pollok
his attorney

DENNIS C. GATELY, OF NEWTOWN, CONNECTICUT, ASSIGNOR TO NEW YORK BELTING AND PACKING COMPANY.

Letters Patent No. 86,296, dated January 26, 1869.

IMPROVED VULCANIZED-RUBBER PACKING.

The Schedule referred to in these Letters Patent and making part of the same.

*To whom it may concern:*

Be it known that I, DENNIS C. GATELY, of Newtown, in the county of Fairfield, and State of Connecticut, have invented certain new and useful Improvements in Vulcanized India-Rubber Packing; and I hereby declare the following to be a full, clear, and exact description of the same, reference being had to the accompanying drawing, which represents a perspective view of a strip of packing made in accordance with my invention.

My invention relates to packing of the kind for which Letters Patent were issued to Charles McBurney on the 28th of June, 1859.

This packing, which is usually employed in the stuffing-boxes of pistons, is composed of plies of cloth or canvas, cut bias, coated with rubber, and pressed together and vulcanized.

When thus made, the packing is very solid, and possesses but little elastic property, so that as it wears there is some difficulty in maintaining a tight joint between it and the piston.

To obviate this disadvantage is the object of my invention, which consists in forming the packing with a backing of pure vulcanized rubber, or rubber of sufficient elasticity for the purpose desired, which may be covered and protected by a strip of canvas or other suitable fabric.

In the drawing—

*a* represents the ordinary packing-band, which is backed by the rubber strip *b*, the whole being vulcanized together, so as to be solidly united; and the rubber may be covered, if desired, by the canvas strip *c*, to protect it from injury.

When the packing is placed in the stuffing-box and around the piston, and the follower is screwed down, so as to compress the packing, the rubber strip will also be compressed, and forced against the sides of the stuffing-box, and as it cannot expand in the direction of the follower, it acts as a spring to hold the packing against the piston-rod, and to prevent leakage, compensating for any slight wear in the packing, and making a tight joint between the rod and the packing.

It would be manifestly impracticable to impart this quality of elasticity to the body of the packing, or that part which is in contact with or bears against the rod, but by backing it with an elastic cushion, which, upon being compressed between the follower and the sides of the stuffing-box, acts as above described, the packing is possessed of every qualification required for its successful use, and a tighter and better joint is made than has heretofore been practicable.

Having now described my invention, and the manner in which the same is or may be carried into effect,

What I claim, and desire to secure by Letters Patent, is—

The combination, with the packing, such as herein specified, of an elastic backing, or cushion of vulcanized India rubber, substantially as and for the purposes set forth.

In testimony whereof, I have signed my name to this specification, before two subscribing witnesses.

D. C. GATELY.

Witnesses:
HENRY BEERS GLOVER,
FLORENCE T. GLOVER.